United States Patent Office 3,111,350
Patented Nov. 19, 1963

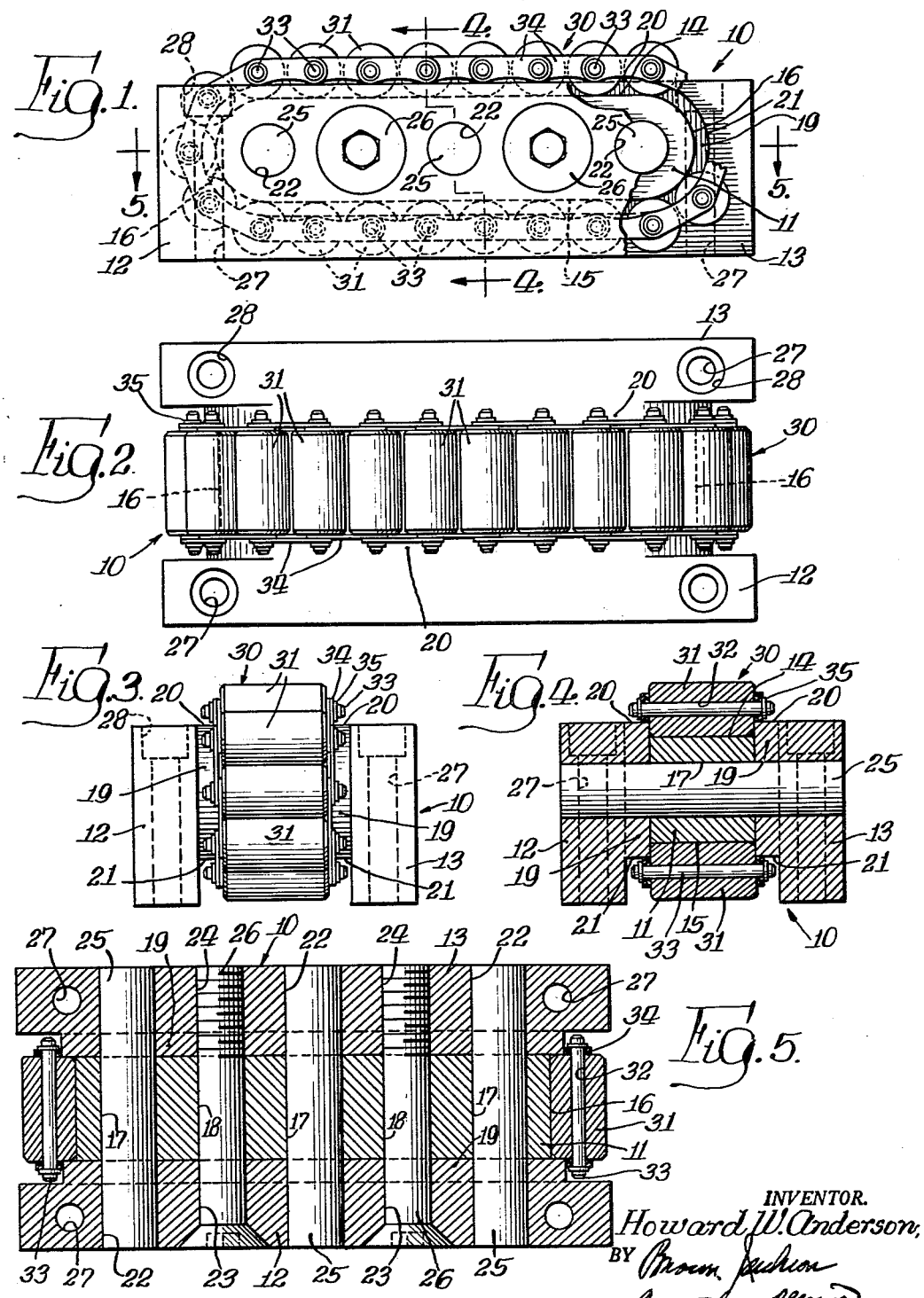

3,111,350
RECIRCULATING ROLLER BEARING
Howard W. Anderson, Muskegon, Mich., assignor to The Kaydon Engineering Corporation, Muskegon, Mich., a corporation of Michigan
Filed June 2, 1961, Ser. No. 114,515
10 Claims. (Cl. 308—6)

The present invention relates to a recirculating roller bearing construction, and more particularly to an improved bearing of this type which incorporates novel structure to eliminate the deficiencies of heretofore known recirculating roller bearings.

Recirculating roller bearings heretofore provided have been of inferior design and relatively poor performance. Such bearings rely for roller circulation, or transmission of movement, upon direct contact of one roller against the next, or in other words pushing of one roller by the following roller. This not only increases friction and wear, but results in a "keystoning" effect in the unloaded zone tending to cause lock-up of the rollers. The rollers also tend to be forced abruptly and unpredictably into the loading zone, causing erratic operation. In addition, no effective guidance is provided for the rollers, resulting in sliding and skewing thereof to increase further the friction in the bearing and the wear on the parts. The friction forces in these bearings consequently are relatively high and, particularly at low operating speeds, very erratic, and the bearing construction is subject to excessive and non-uniform wear. The efficiency of such prior bearings, therefore, is far below what might be achieved, and what might be reasonably expected of an anti-friction roller bearing.

The present invention provides means for guiding the rollers in the desired path and preventing the skewing and cocking of the rollers which commonly occurs in present bearings of this type, and thus avoiding the increased friction and wear and the impaired operation resulting therefrom. The invention also provides a cage which assures uniform spacing of the rollers from each other to obtain proper load distribution and avoid friction generated by contact of the rollers against each other, and effects the desired movement of the rollers about the bearing block or in other words assures proper circulation of the rollers.

There is also provided an approach ramp to the load zone which allows the rollers gradually to enter such zone and pick up their shares of the load, thus avoiding the erratic operation characteristic of present recirculating roller bearing constructions. The free movement and smooth, uniform, and reliable operation of the bearing construction embodying the invention, resulting from the accuracy of structure and alignment of parts and from the minimization of friction in the bearing construction itself, make the present bearings particularly well suited to use in applications requiring great accuracy without sacrifice of freedom of movement. The bearing construction is well adapted, for example, to use in precision grinding machines, but is applicable to any mechanism involving linear motion between parts.

It is accordingly an important object of the invention to provide a recirculating roller bearing construction having greatly reduced friction characteristics.

Another object is the provision of a recirculating roller bearing construction in which wear of the parts is reduced and rendered more uniform for greatly increased useful life.

Another object is the provision of a recirculating roller bearing in which positive guidance is provided for the rollers throughout their path of travel to prevent skewing or cocking thereof and the resulting increased friction and greater wear.

A further object of the invention is the provision of a bearing construction of the type indicated in which the rollers are positively maintained in uniformly spaced relation to avoid friction resulting from the engagement of the rollers against each other and to achieve uniform load distribution.

Another object of the invention is to provide a cage construction for the rollers by which the rollers are uniformly moved around the path provided therefor, avoiding keystoning and locking up of the rollers in the unloaded zone.

The invention has as another object the provision of ramp means for effecting gradual entry into the load zone of the individual rollers and gradual picking up of the load thereby, to assure smooth, predictable, and uniform operation of the bearing.

It is also an object of the invention to provide a recirculating roller bearing construction in which bunching or locking of rollers even at low speeds will not occur.

A further object is the provision of a recirculating roller bearing construction in which movement of the rollers through the desired path is achieved without the pushing of one roller by a following roller.

Another object is the provision of a recirculating roller bearing construction facilitating precision manufacture and assembly of the structure to reduce friction and wear.

Still another object is the provision of a recirculating roller bearing including a bearing block formed in sections for easy manufacture.

Other and further objects, advantages, and features of the invention will become apparent to those skilled in the art from the following detailed description, taken in conjunction with the accompanying drawings, in which:

FIG. 1 is a side elevational view of one embodiment of the invention, partly broken away for clearer illustration;

FIG. 2 is a plan view thereof;

FIG. 3 is an end elevational view thereof;

FIG. 4 is a cross-sectional view taken substantially as indicated by the line 4—4 in FIG. 1; and FIG. 5 is a horizontal sectional view taken substantially as indicated by the line 5—5 in FIG. 1.

As shown in the drawings, the recirculating roller bearing construction according to the present invention, generally indicated as 10, comprises a plurality of bearing rollers arranged to move in either direction in an endless or continuous path about the periphery of an elongated bearing block. The bearing is adapted to be disposed between relatively movable parts of a machine or other structure, being mounted on one of the parts. In the embodiment illustrated, the block is formed of three sections, a central section 11, and a pair of left and right side sections 12 and 13, which are of substantially identical construction, but reversed so that the inner or opposed facing sides thereof are mirror images of each other. The block 11 is rectangular in cross section, having flat parallel sides and flat opposed and parallel bounding surfaces 14 and 15, with rounded ends 16 providing arcuately or otherwise curved surfaces connecting and merging with the surfaces 14 and 15. Extending transversely through the central block section 11 are a number of bores 17, in this case three, and a number of bores 18, two being employed in the present construction. Aligning dowels and securing bolts extend through the bores upon assembly of the block, as hereinafter explained. The flat surface 14 defines a loading area or zone.

The left and right side block sections 12 and 13 have the inner faces thereof formed each with a raised portion 19 exactly corresponding to the central block section 11 in outline, but somewhat larger in size or dimensions, as best shown in FIG. 1, so that the central section 11 may be arranged in centered relation to the raised portions 19, leaving a uniform marginal flat face portion of the raised portion projecting outwardly about the entire periphery of the section 11. The raised portions 19 also provide surfaces extending laterally outwardly from the central section 11 to the inner surfaces of the sections 12 and 13 for purposes of clearance, as will become evident from further description. The laterally outwardly extending surface of each raised portion 19 which extends parallel to and adjacent to the flat loading surface portion 14 of the central section, indicated at 20, is in the present instance formed flush with or as an extension of the adjacent portion of the peripheral surface of the respective side section 12 or 13. The rounded ends of the raised portions 19 extend to the opposite flat edge portions 21, which lie parallel to the flat portion 15 opposite the flat loading surface portion 14. As is best evident from FIG. 4, the flat portions 21 are spaced inwardly of the peripheral surface portions of the side sections 12 and 13 opposite the surface portions with which the flat surfaces 20 of the raised portions merge.

Each of the side sections 12 and 13 is formed with bores 22 extending transversely therethrough substantially identical to the bores 17 of the central section 11, and so located as to register with the bores 17 when the central section 11 is accurately centered relative to the raised portions 19. The left side section 12 is formed with a pair of bores 23 having countersinks or counterbores at the outer face of the section, and the right side section 13 is provided with threaded bores 24, the bores 23 and 24 registering with the bores 18 in the central section 11 upon centering of the central section relative to the raised portions 19 of the side sections. Dowels 25 are inserted through aligned registering bores 17 and 22 of the three sections, as best shown in FIG. 5, in assembling the sections of the block, to assure proper centering of the central section on the raised portions 19, and bolts 26 are passed through the respectively aligned bores 23, 18, and 24, and threadedly secured in the bores 24, to secure the sections in the desired accurately assembled relation described. Adjacent their ends, the side sections 12 and 13 are provided with bores 27 extending from the peripheral surface of each section which extends flush with the flat surface 20 to the opposite peripheral edge surface which projects beyond the surface 21, to accommodate suitable mounting bolts or the like by which the block may be secured to one of the relatively movable parts between which the bearing construction is disposed. The bores may be suitably counterbored, to avoid projection of the bolt heads outwardly of the block surface.

While the block may be formed in one piece, or of more or fewer sections than three, if desired, it will be evident that the parts may be much more readily formed with the desired accuracy, and finished to a desired smoothness to reduce friction, when the block is formed in at least three sections as shown and the sections are assembled after being separately formed and finished. The block construction also facilitates assembly therewith of the bearing rollers, accomplished by application to the block of a roller assembly as described herebelow.

As appears clearly from the drawings, and particularly FIGS. 4 and 5, the block when assembled provides an endless or continuous channel extending about the block, the bottom of which channel is defined by the peripheral surfaces 14, 15, and 16 of the central section 11. Working in this channel is an endless bearing roller assembly, designated generally as 30. The roller assembly comprises a number of rollers 31 each having a length just slightly less than the width of the channel, or in other words the distance between the inner faces of the raised portions 19 of the block side sections 12 and 13. The rollers are disposed transversely of the channel, in spaced parallel relation with each other, as will be clear from the drawings, particularly FIGS. 2 and 4. Each roller has an axial bore 32 therethrough, through which extends a pin 33 on which the roller is rotatable. The ends of the pin 33 project from the roller, and are connected to the pins of each of the adjacent rollers by rigid links apertured at their ends to receive the pins therethrough. The links 34 are held assembled with the pins 33 and rollers 31 by any suitable means, such as snap rings 35 engaging in suitable circumferential grooves in the ends of the pins. The links maintain the rollers in uniformly spaced relation, and define a cage flexible in the plane of movement of the rollers for simultaneous movement in the channel as the rollers in the loading zone defined by the flat surface portion 14 of the central section 11 are rotated in one direction or the other by relative movement of the parts between which the bearing is arranged.

The links 34 and the projecting ends of the pins 33 are accommodated in the clearance space provided by the laterally outwardly extending edge surfaces of the raised portions 19 such as the surfaces 20 and 21. The spacing of these surfaces from the surfaces 14, 15, and 16 of the central section 11 defining the bottom of the channel is sufficiently less than the radius of the rollers 31 to allow the rollers to engage on the channel bottom while allowing a certain clearance between the links 34 and the edge surfaces of the raised portions 19. When the rollers 31 pass along the flat loading zone surface 14 they project outwardly of the peripheral edge portions of the block side sections 12 and 13, as evident from the drawings. The opposite or intermediate surface portion 15 of the central section 11 is spaced inwardly from the plane of the adjacent peripheral edge surfaces of the side sections by a distance greater than the diameter of the rollers, or in other words this portion of the roller channel is in effect formed in the bottom of a deeper channel. Thus the rollers may move freely between the central section 11, or the bottom of the channel, and a surface on which the bearing 10 is mounted. The bottom of the roller channel at the curved ends of section 11 preferably is similarly offset inwardly from the adjacent end surfaces of the side sections so that the rollers will not project outwardly of the block ends as they move along the curved end surfaces.

It will be evident that as the rollers move about the bearing block in the path defined by the channel, they are prevented from skewing by the side walls of the channel, and thus are guided in their path of movement with their axes substantially normal to the direction in which they move. The rounded end surfaces 16 of the center section 11 serve as ramps by which the rollers are moved gradually to the loading zone to pick up the load in a relatively gradual, uniform manner so that there is no erratic operation resulting from the rollers being suddenly or abruptly forced into the loading zone as a result of pressure applied thereto by other rollers, as from a piled-up or keystoned group of rollers in the unloaded zone. As already noted, the rollers are moved as a unit about the block by reason of their connection by the flexible cage, and held in uniformly spaced relation thereby for proper load distribution and avoidance of contact with each other, eliminating keystoning and the like. It will be apparent that the rollers may be rotatable mounted otherwise than by the pins 33. For example, the rollers may be provided with transmissions journalled in the ends of the links 34.

The parts of the bearing construction are very accurately formed, and appropriate parts are made of suitably hard wear-resisting material and with a smooth finish. Any possible interference between parts is thus eliminated, and very low and uniform frictional characteristics are imparted to the bearing.

The embodiment of the invention specifically disclosed herein is exemplary and illustrative, and many changes and modifications may be made therein without departure from the inventive concept. Accordingly, it is not intended that the invention be limited otherwise than as required by the spirit and scope of the appended claims.

I claim:
1. A recirculating roller bearing construction comprising an elongated bearing block formed of three sections including a central section and a pair of side sections engaging opposite sides of said central section, the central section having a pair of substantially parallel flat surfaces extending between said side sections and arcuately curved end surfaces connecting the ends of said flat surfaces, one of said flat surfaces defining a loading zone, raised portions on said side sections engaging the sides of the central section corresponding in outline to the central section but of greater dimensions to provide flat faces at the opposite edges of said flat surfaces projecting uniformly outwardly therefrom in planes substantially normal to the surfaces to define therewith a channel of uniform depth and width extending continuously about the block providing an endless roller pathway, a plurality of rollers disposed in spaced parallel relation in the channel each extending transversely thereof and having a length substantially equal to the width of the channel and a radius greater than the channel depth, a plurality of pins each extending axially of and rotatably carrying one of said rollers, link means extending between and connecting the ends of the pins of adjacent rollers to maintain the rollers in said spaced parallel relation and defining a flexible roller cage extending about said central section, surfaces on the side sections extending laterally outwardly from said flat faces to accommodate said link means and the ends of the pins, said rollers projecting radially outwardly beyond the block in said loading zone and lying within the block along the remainder of the channel, means locating the block sections in precisely assembled relation, and means securing the sections in said relation.

2. A recirculating roller bearing construction comprising an elongated bearing block formed of three sections including a central section and a pair of side sections engaging opposite sides of said central section, the central section having a flat surface defining a loading zone and an intermediate surface spaced therefrom extending between said side sections and also having curved end surfaces connecting the ends of said flat and intermediate surfaces, said central section surfaces defining the bottom of a channel extending continuously about the block, flat faces on the inner sides of said side sections defining the walls of said channel, surfaces on the side sections extending laterally outwardly of said flat faces in uniformly spaced relation to the central section surfaces, a plurality of rollers disposed in spaced parallel relation each extending transversely of the channel on said channel bottom and having a radius greater than the channel depth and a length substantially equal to the width of the channel, a plurality of pins each rotatably carrying one of said rollers, link means connecting the pins of adjacent rollers to maintain the rollers in said spaced parallel relation and defining a flexible roller cage extending about said central section with the link means and the ends of the pins overlying said laterally outwardly extending surfaces, said channel bottom being recessed relative to the bounding surfaces of the block defined by peripheral edges of the side sections, said recessing being less than the roller diameter along said loading zone and at least equal to said diameter along the remainder of the channel, means locating the block sections in precisely assembled relation, and means securing the sections in said relation.

3. A recirculating roller bearing construction comprising a bearing block formed of a plurality of sections, means locating the block sections in precisely assembled relation, means securing the sections in said relation, said sections being shaped to define a continuous channel of substantially uniform depth and width extending about said block and including a flat loading zone portion with ramp portions at the ends thereof, a plurality of rollers disposed in spaced parallel relation each extending transversely of the channel on the channel bottom and having a radius greater than the channel depth and a length substantially equal to the channel width, shaft means for rotatably mounting each of said rollers, and link means connecting said roller shaft means disposed axially outwardly of and maintaining the rollers in said spaced parallel relation, to define a flexible roller cage, surfaces extending laterally outwardly of the walls of the channel accommodating and being overlain by said link means, the channel bottom at said loading zone portion being recessed relative to the adjacent block surface a distance less than the roller diameter, and the opposite portion of the channel bottom being recessed relative to the opposite block surface a distance at least equal to said diameter.

4. A recirculating roller bearing construction comprising a bearing block formed of a plurality of longitudinally divided sections shaped to define a continuous channel of substantially uniform width and depth extending longitudinally about said block and including a pair of ramp portions having a flat loading portion extending therebetween, the bottom of said channel being offset inwardly from the peripheral surface of the block, a plurality of rollers disposed in spaced parallel relation each extending transversely of the channel on the channel bottom and having a radius greater than the channel depth and a length substantially equal to the channel width, endless flexible roller cage means linking said rollers in separately rotatable spaced parallel relation, means providing clearance for said cage means laterally outwardly of the channel, the bottom of said channel at said loading portion being spaced inwardly relative to the adjacent peripheral surface of the block by a distance less than the roller diameter, and spacing means projecting outwardly relative to the portion of the channel bottom opposite said loading portion a distance at least equal to the roller diameter.

5. A recirculating roller bearing construction comprising an elongated bearing block formed of three sections including a central section and a pair of side sections, said central section having a pair of opposite substantially parallel flat faces connected by arcuately curved end faces, a raised portion on each of said side sections engaged against a side of the central section having a periphery defined by surfaces offset uniformly outwardly of said central section faces to extend parallel thereto laterally outwardly of the central section and also having a face portion in a plane normal to said central section faces extending between said faces and said surfaces, whereby an endless channel providing a roller pathway is defined extending about said block having a loading zone defined by one of said flat faces, a plurality of rollers disposed in said channel in uniformly spaced parallel relation each extending transversely of the channel and of a length substantially equal to the channel width and a radius greater than the channel depth, a plurality of pins each rotatably carrying one of said rollers and projecting over said periphery-defining surfaces, and endless link means connecting said roller pins to maintain said spaced parallel roller relation, said block side sections having peripheral edge portions spaced outwardly relative to the bottom of the channel, said spacing along the loading zone being less than the roller diameter and along the opposite flat face being greater than said diameter.

6. A recirculating roller bearing construction comprising a bearing block formed of three sections including a central section and a pair of side sections, said central section having at least one substantially flat face defining a loading zone and curved end faces connecting to said flat face at its ends, a raised portion on each of said side sections engaged against a side of the central section having a periphery defined by surfaces offset uniformly outwardly of said central section flat face to extend parallel thereto laterally outwardly of the central section and also having a face portion extending between said faces and said surfaces, whereby an endless channel providing a roller pathway is defined extending about said block, a plurality of rollers disposed in said channel in uniformly spaced parallel relation each extending transversely of the channel and having a length substantially equal to the channel width and a radius greater than the channel depth, a plurality of pins each rotatably carrying one of said rollers and projecting over said periphery-defining surfaces, and endless link means connecting said roller pins to maintain said spaced parallel roller relation, said loading zone flat face being spaced relative to the adjacent peripheral edge portions of the block side sections to effect radial projection of rollers in the loading zone outwardly relative to said edge portions.

7. A recirculating roller bearing construction for mounting between relatively movable members, comprising a bearing block, a roller guidance pathway extending continuously about said block defined by a bottom surface and a pair of parallel guiding side surfaces extending in planes substantially normal to said bottom surface, a plurality of rollers disposed in spaced parallel relation to each other in said pathway each extending transversely thereof and having a length corresponding closely to the spacing between said side surfaces, endless means connecting said rollers in said spaced relation in individually rotatable relation, said pathway having a depth appreciably less than half the diameter of the rollers, means providing clearance laterally outwardly of the pathway to accommodate projection of said endless connecting means longitudinally outwardly of the rollers, a loading zone defined by a portion of the bottom of the pathway spaced relative to the adjacent block surface to effect radial projection of the rollers outwardly of said block surface, and means for mounting the block on the surface of a relatively movable member with an opposite portion of the pathway bottom spaced from said member surface by a distance not less than the roller diameter.

8. A recirculating roller bearing construction comprising a bearing block, a roller guidance pathway extending continuously about said block defined by a bottom surface and a pair of parallel guiding side surfaces extending in planes intersecting said bottom surface at the opposite edges thereof and also intersecting the outer block surface, a plurality of rollers disposed in spaced parallel relation to each other in said pathway each extending transversely thereof and having a length corresponding closely to the spacing between said side surfaces for guidance thereby, and endless means connecting said rollers in said spaced relation in individually rotatable relation, said pathway having a depth appreciably less than the radius of the rollers, a portion of the pathway bottom being spaced inwardly relative to the adjacent outer block surface by a distance less than the roller diameter to effect radial projection of the rollers outwardly beyond said block surface, means providing clearance laterally outwardly of the pathway for said endless connecting means, and means for mounting the block on the surface of a relatively movable member with an opposite portion of said pathway bottom spaced from said member surface by not less than the roller diameter.

9. A recirculating roller bearing construction comprising a bearing block, an endless roller guidance channel of substantially uniform depth and width within a peripheral surface of said block extending about said block having a flat loading portion and an opposite intermediate portion spaced from said flat portion with curved portions extending between and connecting adjacent ends of the flat and intermediate portions, a plurality of rollers disposed in said channel in parallel uniformly spaced relation to each other extending transversely of and fitting closely in the channel, the channel bottom at said flat loading portion being spaced inwardly relative to the adjacent portion of said block surface a distance less than the diameter of the rollers and at said intermediate portion being spaced inwardly relative to the opposite block surface portion a distance at least equal to the roller diameter, endless cage means linking said rollers in rotatable space-maintaining relation, and means providing clearance for said cage means laterally outwardly of the channel.

10. A recirculating roller bearing construction comprising a bearing block, an endless roller guidance channel extending about said block having a flat portion and an intermediate portion generally opposed to said flat portion with ramp portions extending between and connecting adjacent ends of the flat and intermediate portions, a plurality of rollers disposed in said channel in parallel uniformly spaced relation to each other extending transversely of and fitting closely in the channel, the bottom of the channel at said flat portion being spaced inwardly of the adjacent block surface a distance less than the diameter of the rollers, spacing means projecting outwardly relative to the channel bottom at said intermediate portion a distance not less than the roller diameter, endless cage means linking said rollers in rotatable space-maintaining relation, and means providing clearance for said cage means laterally outwardly of the channel.

References Cited in the file of this patent

UNITED STATES PATENTS

| 2,664,970 | Warshaw | Jan. 5, 1954 |
| 2,723,886 | Warshaw | Nov. 15, 1955 |
| 2,889,181 | Lang | June 2, 1959 |
| 3,003,828 | Stark | Oct. 10, 1961 |

FOREIGN PATENTS

| 556,746 | Great Britain | Oct. 20, 1943 |
| 1,073,668 | France | Mar. 24, 1954 |